(12) United States Patent
Barabas et al.

(10) Patent No.: US 9,380,143 B2
(45) Date of Patent: Jun. 28, 2016

(54) AUTOMATICALLY DISABLING THE ON-SCREEN KEYBOARD OF AN ELECTRONIC DEVICE IN A VEHICLE

(71) Applicant: VOXX INTERNATIONAL CORPORATION, Hauppauge, NY (US)

(72) Inventors: Laszlo Barabas, Palos Verdes Peninsula, CA (US); Alfred Barabas, La Habra, CA (US); Brendan Shanks, Long Beach, CA (US); James R. Tranchina, Dix Hills, NY (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 179 days.

(21) Appl. No.: 14/143,869

(22) Filed: Dec. 30, 2013

(65) Prior Publication Data

US 2015/0062017 A1 Mar. 5, 2015

Related U.S. Application Data

(60) Provisional application No. 61/872,018, filed on Aug. 30, 2013.

(51) Int. Cl.
| | |
|---|---|
| *G09G 5/00* | (2006.01) |
| *H04M 1/67* | (2006.01) |
| *G08G 1/0962* | (2006.01) |
| *H04M 1/60* | (2006.01) |
| *H04M 1/725* | (2006.01) |

(52) U.S. Cl.
CPC .............. *H04M 1/67* (2013.01); *H04M 1/6091* (2013.01); *G08G 1/0962* (2013.01); *H04M 1/6083* (2013.01); *H04M 1/72577* (2013.01); *H04M 2250/12* (2013.01)

(58) Field of Classification Search
CPC ....... H04W 12/06; H04W 4/001; H04W 4/02; H04W 4/027; H04W 4/24; H04W 4/003; H04W 4/023; H04W 4/18; H04W 4/046; H04W 8/22; H04W 48/04; H04W 4/028; H04W 4/20; H04W 76/023; H04W 8/005; H04W 8/04; G06F 21/72; G06F 21/83; G06F 11/3612; G06F 11/3636; G06F 2009/45591; G06F 9/45558; G06F 11/14; G06F 11/1438; G06F 11/1446; G06F 11/1458; G06F 11/1471; G06F 11/1484; G06F 11/2023; G06F 11/02
USPC ........................ 345/173–175, 168, 169, 172
See application file for complete search history.

(56) References Cited

U.S. PATENT DOCUMENTS

| | | | |
|---|---|---|---|
| 5,148,153 A | 9/1992 | Haymond | |
| 8,280,438 B2 * | 10/2012 | Barbera | 455/557 |

(Continued)

OTHER PUBLICATIONS

International Search Report dated Apr. 1, 2015 for PCT/US14/53375.

*Primary Examiner* — Duc Dinh
(74) *Attorney, Agent, or Firm* — F. Chau & Associates, LLC (57) ABSTRACT

A keyboard deactivation module includes a processor configured to generate an on-screen keyboard control signal, a CAN bus interface configured to connect to a CAN bus of a vehicle, and obtain vehicle speed information indicating a current speed of the vehicle from the vehicle via the CAN bus, and a Bluetooth radio configured to transmit the on-screen keyboard control signal to a target electronic device. An on-screen keyboard of the target electronic device is enabled in response to receiving the on-screen keyboard control signal while the vehicle speed information indicates that the current speed of the vehicle is below a specified threshold, and the on-screen keyboard of the target electronic device is disabled in response to receiving the on-screen keyboard control signal while the vehicle speed information indicates that the current speed of the vehicle is above a specified threshold. The keyboard deactivation module is mounted in the vehicle.

25 Claims, 2 Drawing Sheets

(56) References Cited

U.S. PATENT DOCUMENTS

| | | |
|---|---|---|
| 2003/0132950 A1 | 7/2003 | Surucu et al. |
| 2004/0145457 A1 | 7/2004 | Schofield et al. |
| 2006/0202964 A1 | 9/2006 | Liaw et al. |
| 2009/0262007 A1 | 10/2009 | Kelly |
| 2010/0184406 A1* | 7/2010 | Schrader ................. 455/411 |
| 2011/0009107 A1* | 1/2011 | Guba et al. .............. 455/418 |
| 2013/0024777 A1* | 1/2013 | Brakensiek et al. ...... 715/740 |
| 2013/0197973 A1 | 8/2013 | Liu et al. |

\* cited by examiner

AUTOMATICALLY DISABLING THE ON-SCREEN KEYBOARD OF AN ELECTRONIC DEVICE IN A VEHICLE

CROSS-REFERENCE TO RELATED APPLICATIONS

This application claims priority to and the benefit of Provisional Application Ser. No. 61/872,018, filed on Aug. 30, 2013, the disclosure of which is herein incorporated by reference in its entirety.

BACKGROUND

1. Technical Field

Exemplary embodiments of the present invention relate to a keyboard deactivation module permitting automatic disabling of the on-screen keyboard of an electronic device in a vehicle.

2. Discussion of Related Art

Distracted driving due to the use of electronic devices such as cell phones is a common problem, and although some late model cars offer Bluetooth integration kits to support handsfree calling, many automakers do not offer a viable solution to prohibit text input on a cell phone and other electronic devices while a vehicle is being driven. Although some third party applications exist for select cell phones and electronic devices running certain operating systems to restrict certain uses such as texting while driving, such applications are not available for all cell phones and electronic devices, and may be application specific, only prohibiting text input in certain applications installed on the device.

SUMMARY

According to an exemplary embodiment of the present invention, a keyboard deactivation module includes a processor configured to generate an on-screen keyboard control signal, a CAN (controller area network) bus interface configured to connect to a CAN bus of a vehicle, and obtain vehicle speed information indicating a current speed of the vehicle from the vehicle via the CAN bus, and a Bluetooth radio configured to transmit the on-screen keyboard control signal to a target electronic device. An on-screen keyboard of the target electronic device is enabled in response to the target electronic device receiving the on-screen keyboard control signal while the vehicle speed information indicates that the current speed of the vehicle is below a specified threshold, and the on-screen keyboard of the target electronic device is disabled in response to the target electronic device receiving the on-screen keyboard control signal while the vehicle speed information indicates that the current speed of the vehicle is above a specified threshold. The keyboard deactivation module is mounted in the vehicle.

In an exemplary embodiment, the on-screen keyboard control signal corresponds to a standard human interface device (HID) command indicating to the target electronic device whether an external keyboard is connected to the target electronic device.

In an exemplary embodiment, the on-screen keyboard control signal corresponds to a standard human interface device (HID) command indicating to the target electronic device whether a keystroke from an external keyboard has been detected.

In an exemplary embodiment, the on-screen keyboard control signal includes an enable on-screen keyboard signal and a disable on-screen keyboard signal. The Bluetooth radio is configured to transmit the enable on-screen keyboard signal to the target electronic device while the vehicle speed information indicates that the current speed of the vehicle is below the specified threshold, and transmit the disable on-screen keyboard signal to the target electronic device while the vehicle speed information indicates that the current speed of the vehicle is above the specified threshold. The on-screen keyboard of the target electronic device is enabled upon the target electronic device receiving the enable on-screen keyboard signal, and the on-screen keyboard of the target electronic device is disabled upon the target electronic device receiving the disable on-screen keyboard signal.

In an exemplary embodiment, the enable on-screen keyboard signal corresponds to a first standard human interface device (HID) command indicating to the target electronic device that an external keyboard is currently connected to the target electronic device, and the disable on-screen keyboard signal corresponds to a second standard HID command indicating to the target electronic device that the external keyboard is not currently connected to the target electronic device.

In an exemplary embodiment, the enable on-screen keyboard signal corresponds to a first standard human interface device (HID) command indicating to the target electronic device that a keystroke from an external keyboard has been detected, and the disable on-screen keyboard signal corresponds to a second standard HID command indicating to the target electronic device that the keystroke from the external keyboard has not been detected.

In an exemplary embodiment, the keyboard deactivation module does not include a keyboard.

According to an exemplary embodiment of the present invention, a keyboard deactivation module includes a global positioning system (GPS) radio configured to determine a location of a vehicle, a processor configured to generate an on-screen keyboard control signal, and determine a current speed of the vehicle using the GPS radio, and a Bluetooth radio configured to transmit the on-screen keyboard control signal to a target electronic device. An on-screen keyboard of the target electronic device is enabled in response to the target electronic device receiving the on-screen keyboard control signal while the current speed of the vehicle is determined to be below a specified threshold, and the on-screen keyboard of the target electronic device is disabled in response to the target electronic device receiving the on-screen keyboard control signal while the current speed of the vehicle is determined to be above the specified threshold. The keyboard deactivation module is mounted in the vehicle.

According to an exemplary embodiment of the present invention, a keyboard deactivation module includes a processor configured to generate an on-screen keyboard control signal, and a Bluetooth radio configured to transmit the on-screen keyboard control signal to a target electronic device. An on-screen keyboard of the target electronic device is enabled in response to the target electronic device receiving the on-screen keyboard control signal while a current speed of a vehicle is determined to be below a specified threshold, and the on-screen keyboard of the target electronic device is disabled in response to the target electronic device receiving the on-screen keyboard control signal while the current speed of the vehicle is determined to be above the specified threshold. The current speed of the vehicle is determined by querying the target electronic device. The keyboard deactivation module is mounted in the vehicle.

In an exemplary embodiment, the current speed of the vehicle is determined using at least one of a GPS radio of the target electronic device, a cellular radio of the target electronic device, and a WiFi radio of the target electronic device.

According to an exemplary embodiment of the present invention, a computer readable storage medium embodying instructions executed by a processor to perform a method of enabling and disabling an on-screen keyboard of a target electronic device includes obtaining vehicle speed information indicating a current speed of a vehicle, generating an on-screen keyboard control signal, and transmitting the on-screen keyboard control signal to the target electronic device via a Bluetooth connection. The on-screen keyboard of the target electronic device is enabled in response to the target electronic device receiving the on-screen keyboard control signal while the vehicle speed information indicates that the current speed of the vehicle is below a specified threshold, and the on-screen keyboard of the target electronic device is disabled in response to the target electronic device receiving the on-screen keyboard control signal while the vehicle speed information indicates that the current speed of the vehicle is above a specified threshold. The computer readable storage medium is embedded within an electronic system mounted within the vehicle.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

Exemplary embodiments of the present invention provide a new use of leveraging existing functionality within an operating system (e.g., a mobile operating system of a mobile electronic device) that supports the use of an external keyboard in order to automatically disable the operating system's on-screen keyboard (e.g., the software keyboard shown on the display of a mobile electronic device) while a vehicle is in motion. For example, referring to electronic devices that run the Apple® iOS operating system (e.g., the Apple® iPhone® and Apple® iPad®), exemplary embodiments leverage iOS support of an external keyboard in order to disable the on-screen keyboard of the iOS device while a vehicle is determined to be in motion. Although exemplary embodiments described herein may refer specifically to electronic devices running the iOS operating system, exemplary embodiments are not limited thereto. For example, exemplary embodiments may be implemented for any electronic device running an operating system that disables the on-screen keyboard of the device upon detection of a connection to an external keyboard.

Some mobile operating systems including, for example, the Apple® iOS operating system, are designed to disable the on-screen keyboard on an electronic device when a connection to an external keyboard (e.g., a physical keyboard separate from the electronic device) is detected. For example, when an external keyboard is connected to an electronic device via a wireless connection or a physical connection (e.g., via a wire, connection port, etc.), the operating system of the electronic device may automatically disable and hide the on-screen keyboard, and prohibit the user from using the on-screen keyboard. That is, in mobile operating systems that support external keyboards, when an external keyboard is connected to the electronic device, the on-screen keyboard of the device may be disabled and hidden, and when the external keyboard is not connected to the electronic device, the on-screen keyboard may be enabled and accessible on the electronic device. Based on this principle, according to exemplary embodiments of the present invention, a keyboard deactivation module in communication with an electronic device may mimic the presence of an external keyboard to disable the on-screen keyboard of the electronic device when a vehicle is in motion. The keyboard deactivation module is described in further detail below.

Figure 1:
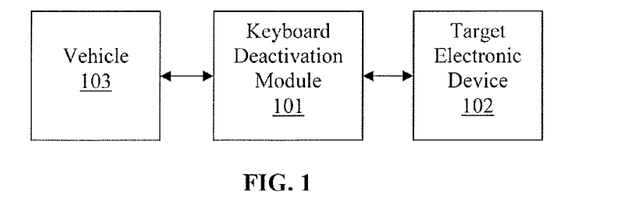
FIG. 1 shows an overview of a system for disabling an on-screen keyboard of an electronic device, according to an exemplary embodiment of the present invention.

FIG. 1 shows an overview of a system for disabling an on-screen keyboard of an electronic device, according to an exemplary embodiment of the present invention.

Referring to FIG. 1, according to an exemplary embodiment, a system for disabling an on-screen keyboard of an electronic device includes a keyboard deactivation module 101 connected to an electronic device 102 and a vehicle 103. The keyboard deactivation module 101 may be disposed within the vehicle 103. The electronic device may be any type of device that includes an on-screen keyboard and runs an operating system configured to disable the on-screen keyboard upon detecting a connection to an external keyboard. For example, the electronic device may be a cell phone, a tablet computer, etc. Hereinafter, an electronic device for which it is desired to disable its on-screen keyboard may be referred to as a target device 102.

According to exemplary embodiments of the present invention, a connection (e.g., a wired or wireless connection such as, for example, a Bluetooth connection) is established between the keyboard deactivation module 101 and the target device 102, and a connection may also be established between the keyboard deactivation module 101 and the vehicle.

Figure 2:
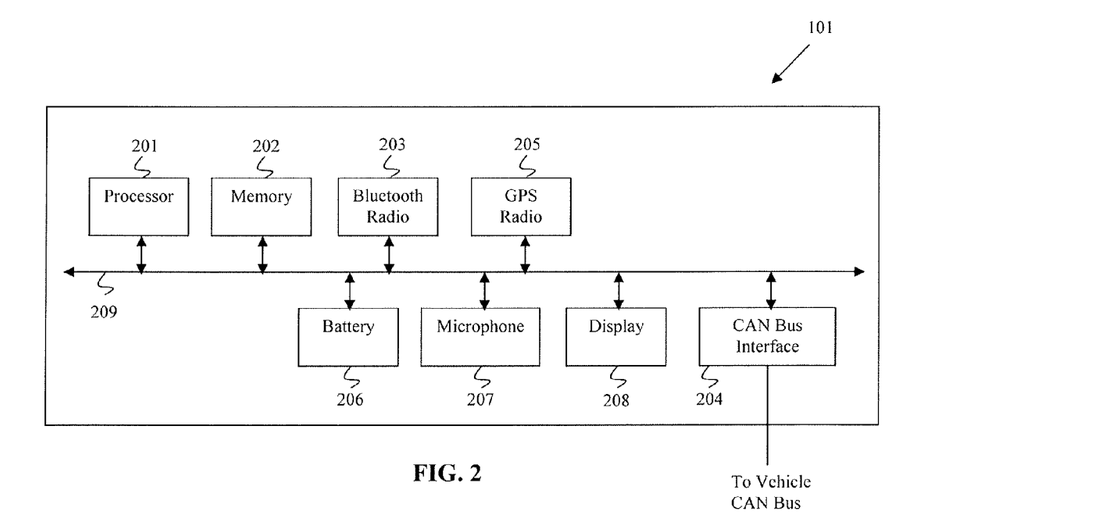
FIG. 2 is a block diagram of a keyboard deactivation module, according to an exemplary embodiment of the present invention.

A block diagram of the keyboard deactivation module 101 according to an exemplary embodiment is shown in FIG. 2. The keyboard deactivation module 101 may include, for example, a processor 201, a memory 202, a Bluetooth radio 203, a CAN (controller area network) bus interface 204, a global positioning system (GPS) radio 205, a battery 206, a microphone 207, and/or a display 208 connected via a bus 209. The keyboard deactivation module 101 may include some or all of these components. The processor 201 may generate an on-screen keyboard control signal to enable/disable the on-screen keyboard of the target device 102. The memory 202 may store instructions executable by the processor 201 to generate the on-screen keyboard control signal, and determine whether the on-screen keyboard of the target device 102 is to be enabled or disabled, as described in further detail below. The Bluetooth radio 202 may establish a wireless connection with the target device 102 and/or the vehicle. The CAN bus interface 204 may connect to the CAN bus of the vehicle to communicate with a subsystem(s) of the vehicle to, for example, obtain vehicle speed information from the vehicle, or communicate with the audio/video system of the vehicle. The GPS radio 205 may be used to obtain vehicle speed information.

In an exemplary embodiment, although the keyboard deactivation module 101 does not include a keyboard, the keyboard deactivation module 101 identifies itself to the target device 102 as an external keyboard, causing the target device 102 to automatically disable its on-screen keyboard. The keyboard deactivation module 101 may be, for example, a stand-alone unit or a system block that is embedded (e.g., via software) within an existing electronic system present in the vehicle such as, for example, a radio, audio system, infotainment system, or other electronic system in the vehicle. The keyboard deactivation module 101 may be connected to the target device 102 via a wireless (e.g., Bluetooth) or a wired connection.

In an exemplary embodiment in which the keyboard deactivation module 101 is a stand-alone unit that is not embedded within an existing system of the vehicle, the keyboard deactivation module 101 may be mounted within the vehicle. For example, the keyboard deactivation module 101 may be mounted to a variety of surfaces within the vehicle including, for example, within the vehicle's console or dashboard, within a seat or headrest of the vehicle, within the overhead of the vehicle, etc. The keyboard deactivation module 101 may be mounted such that it is not visible to people in the vehicle. The keyboard deactivation module 101 may also be a removable unit capable of being removed from the vehicle, allowing the module 101 to be used in another vehicle, or in another environment. The removable keyboard deactivation module 101 may be docked in a docking station within the vehicle configured to receive the keyboard deactivation module 101, or the module 101 may be used in the vehicle without a corresponding docking station.

The keyboard deactivation module 101 may receive power from the vehicle (e.g., via a connection to the vehicle's battery), and/or may include its own battery 206, allowing the module 101 to be used in locations in which the module 101 is not connected to a power source. The keyboard deactivation module 101 may receive power via the cigarette lighter receptacle in the vehicle, or via another connection to the vehicle's battery.

According to exemplary embodiments of the present invention, enabling/disabling the on-screen keyboard of the target device 102 is based on a determination of whether the vehicle is in motion. The keyboard deactivation module 101 may determine whether the vehicle is in motion using a variety of methods. For example, the keyboard deactivation module 101 may be connected to the CAN bus of a vehicle using the CAN bus interface 204. Connection to the CAN bus of the vehicle allows the keyboard deactivation module 101 to communicate with various subsystems of the vehicle, and allows the keyboard deactivation module 101 to receive vehicle speed information directly from the vehicle. Further, the keyboard deactivation module 101 may include a GPS radio 205 allowing the module 101 to determine vehicle speed information. In addition, the keyboard deactivation module 101 may utilize components of the target device 102 to determine vehicle speed information. For example, the keyboard deactivation module 101 may determine vehicle speed information by querying components of the target device 102 that provide information that may be used to determine vehicle speed including, for example, the GPS radio, WiFi radio, and/or cellular radio of the target device 102. In exemplary embodiments that utilize the target device 102 to determine vehicle speed information, software may be installed on the target device to transmit data to the keyboard deactivation module 101 that allows for the determination of vehicle speed information. According to exemplary embodiments, the keyboard deactivation module 101 may utilize some or all of these methods to determine vehicle speed information.

The keyboard deactivation module 101 transmits an on-screen keyboard control signal to the target device 102. The vehicle speed information, along with a specified threshold, which may be pre-set for the keyboard deactivation module 101 or set by a user, are utilized to determine the action to be performed on the target device 102 in response to receiving the on-screen keyboard control signal.

For example, when the vehicle speed information indicates that the current speed of the vehicle is below (or about equal to) the specified threshold, the on-screen keyboard of the target device 102 is enabled in response to the target device 102 receiving the on-screen keyboard control signal (e.g., the on-screen keyboard control signal acts as an enable on-screen keyboard signal). When enabled, the user is permitted to interact with the target device 102 via the on-screen keyboard.

When the vehicle speed information indicates that the current speed of the vehicle is above the specified threshold, the on-screen keyboard of the target device 102 is disabled in response to the target device 102 receiving the on-screen keyboard control signal (e.g., the on-screen keyboard control signal acts as a disable on-screen keyboard signal). When disabled, the user is prohibited from interacting with the target device 102 via the on-screen keyboard.

The on-screen keyboard control signal may be a single signal that toggles the current state of the on-screen keyboard, or may include two different signals (e.g., an enable on-screen keyboard signal and a disable on-screen keyboard signal) that respectively force the state of the on-screen keyboard into either an enabled state or a disabled state.

The specified threshold may be set to about 0 mph, resulting in a configuration in which the keyboard deactivation module 101 enables the on-screen keyboard of the target device 102 while the vehicle is stationary, and disables the on-screen keyboard of the target device 102 while the vehicle is in motion.

In an exemplary embodiment, reception of the on-screen keyboard control signal while the vehicle is above the specified threshold (e.g., reception of the on-screen keyboard control signal acting as a disable on-screen keyboard signal) indicates to the target device 102 that an external keyboard is connected to the target device 102—even though no external keyboard is present—thereby disabling the on-screen keyboard of the target device 102.

In an exemplary embodiment, reception of the on-screen keyboard control signal while the vehicle is above the specified threshold (e.g., reception of the on-screen keyboard control signal acting as a disable on-screen keyboard signal) indicates to the target device 102 that a keystroke from an external keyboard has been detected—even though no keystroke has actually been detected—thereby disabling the on-screen keyboard of the target device 102.

Figure 3:
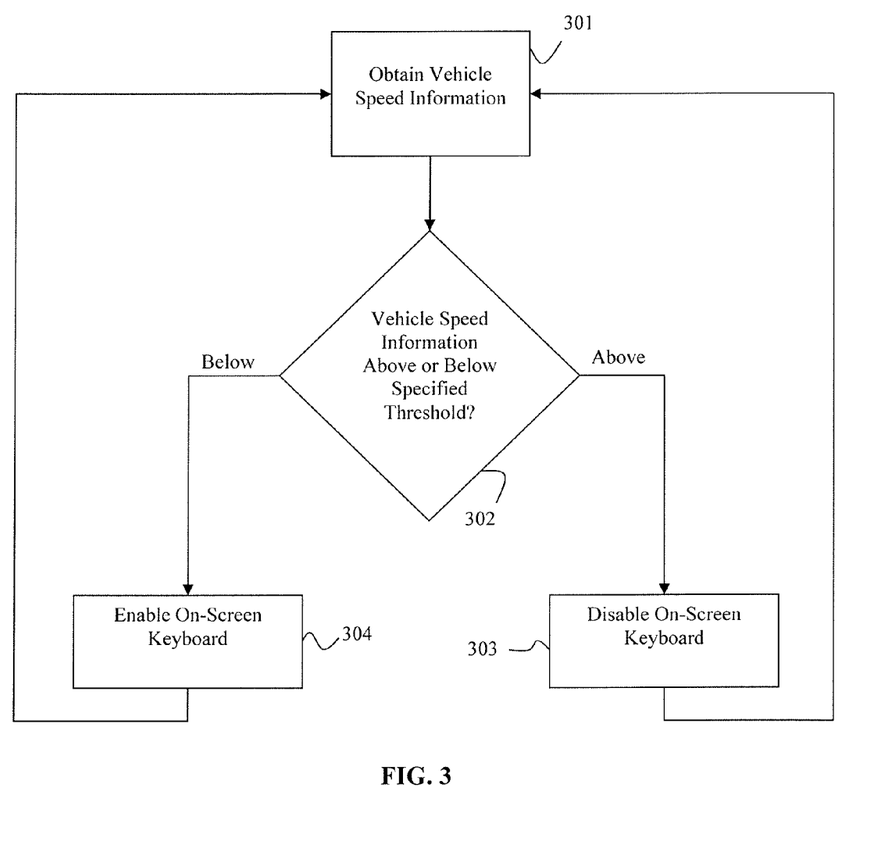
FIG. 3 is a flowchart showing a method of enabling/disabling an on-screen keyboard of an electronic device, according to an exemplary embodiment of the present invention.

FIG. 3 is a flowchart showing a method of enabling/disabling an on-screen keyboard of the target device 102, according to an exemplary embodiment of the present invention.

Referring to FIG. 3, vehicle speed information is obtained at block 301. At block 302, it is determined whether the vehicle speed information indicates that the current vehicle speed is above or below (or about equal to) the specified threshold. When the current vehicle speed is determined to be above the specified threshold, the on-screen keyboard of the target device 102 is disabled in response to the target device 102 receiving the on-screen keyboard control signal from the keyboard deactivation module 101 at block 303. When the current vehicle speed is determined to be below (or about equal to) the specified threshold, the on-screen keyboard of the target device 102 is enabled in response to the target device 102 receiving the on-screen keyboard control signal from the keyboard deactivation module 101 at block 304.

In an exemplary embodiment, the keyboard deactivation module 101 may disable the on-screen keyboard of the target device 102 at all times while the target device 102 is located in the vehicle. For example, the keyboard deactivation module 101 may disable the on-screen keyboard at all times while the module 101 is connected to the target device 102, or at all times while the module 101 is connected to the vehicle.

The keyboard deactivation module 101 is not limited to connecting to and disabling the on-screen keyboard of only a single target device. For example, in exemplary embodiments, the keyboard deactivation module 101 may disable the on-screen keyboard of a plurality of electronic devices. The keyboard deactivation module 101 may distinguish between different connected devices, and only disable on-screen keyboard functionality for certain devices. This may be accomplished using a variety of methods such as, for example, maintaining a blacklist/whitelist of devices, or using beacon(s) disposed within the vehicle.

In addition to enabling/disabling the on-screen keyboard of the target device 102 based on the current speed of the vehicle, additional conditions may be utilized by the keyboard deactivation module 101 to further specify when the on-screen keyboard is to be disabled. For example, time-of-day constraints may be utilized to disable the on-screen keyboard only at certain times. When multiple target devices are connected to the keyboard deactivation module 101, the respective on-screen keyboards of the different target devices may be enabled/disabled based on different conditions (e.g., a combination of a speed threshold and time-of-day constraints).

As described above, the connection between the keyboard deactivation module 101 and the target device 102 may be a wired connection or a wireless connection such as, for example a Bluetooth connection. Standard human interface device (HID) profiles and commands may be utilized to enable and disable the on-screen keyboard of the target device 101. Since most electronic devices recognize and interact with standard HID profiles and commands, utilization of standard HID profiles and commands allows the keyboard deactivation module 101 to be utilized with a variety of different electronic devices. The HID profile may be implemented over a wireless link such as, for example, Bluetooth, as described herein, other types of wireless connections, or using wired connections (e.g., a USB connection, Lightning® connection, 30-pin connection, or serial port connection).

Bluetooth profiles are specifications regarding aspects of Bluetooth-based wireless communication between devices. Bluetooth profiles allow for different functionality to be implemented via a Bluetooth connection between devices. The Service Discovery Application Protocol (SDAP) may be implemented by the keyboard deactivation module 101 to discover the available services supported by the target device 102. For example, when the keyboard deactivation module 101 is paired with the target device 102, specific functions and features are enabled based on the implemented Bluetooth profiles. Supported Bluetooth profiles may include, for example, the Hands-Free Profile (HFP) for handling phone calls, the Phone Book Access Profile (PBAP) for accessing contact information on the target device, the SIM Access Profile (SAP) for accessing information stored on the SIM card of the target device, the Serial Port Profile (SPP) for data communication, the Object Push Profile (OPP) and Object Exchange Profile (OBEX) for supporting the handling of virtual business cards, the Message Access Profile (MAP), and the Human Interface Device Profile (HID).

In an exemplary embodiment, the MAP profile may be implemented to provide the keyboard deactivation module 101 with access to messages on the target device 102. The keyboard deactivation module 101 may include a microphone, and text-to-speech (TTS) may be used to provide input to the target device 102 using voice without the user having to physically interact with the target device 102. The keyboard deactivation module 101 may also utilize a microphone of the vehicle for TTS via connection to the vehicle's CAN bus. The keyboard deactivation module 101 may include a display, or may be connected to a display of the vehicle via connection to the vehicle's CAN bus. When a display is utilized by the keyboard deactivation module 101, the MAP profile may be used to display messages to the user. Messages may also be displayed to the user on another screen in the vehicle that is connected to the keyboard deactivation module 101 (e.g., via a wired or wireless connection).

Since standard HID profiles and commands are utilized, the keyboard deactivation module 101 may be used with operating systems that utilize standard HID profiles and commands (e.g., Apple®'s iOS, Android®, Windows®, etc.). For these operating systems, an HID command may be mapped to a function of the operating system. For example, a standard HID command may be mapped to an operating system function that enables/disables the on-screen keyboard (e.g., a standard HID Usage ID may be remapped to the standard AL Keyboard Layout HID Usage Name to toggle the on-screen keyboard of the target device 102). Thus, in exemplary embodiments, the on-screen keyboard control signal transmitted by the keyboard deactivation module 101 may correspond to a standard HID command indicating to the target electronic device 102 whether an external keyboard is connected to the target electronic device 102, or a standard HID command indicating to the target electronic device 102 whether a keystroke from an external keyboard has been detected.

The keyboard deactivation module 101 may be controlled by the user (e.g., to view and access settings of the module 101) via a variety of means including, for example, software installed on a connected electronic device (e.g., the target device 102), a display and input means (e.g., a touchscreen interface, buttons, etc.) disposed on the module 101, or another display connected to the module 101 (e.g., a display in the vehicle connected to the module 101 wirelessly, via a wired connection, or via the vehicle's CAN bus).

In an exemplary embodiment, the keyboard deactivation module 101 may be embodied as a software module that is embedded within an existing system of the vehicle (e.g., a built-in infotainment system, built-in vehicle radio, built-in vehicle navigation system, etc.). The keyboard deactivation module 101 may also function as a Bluetooth hands-free kit that implements Bluetooth hands-free kit functionality, as well as other functionality including, for example, utilization of a Bluetooth audio streaming profile. The keyboard deactivation module 101 may add an HID profile to the list of Bluetooth profiles binded by the existing system upon the pairing process, thereby enabling seamless state control over the on-screen keyboard of the target device 102 via the existing system.

In an exemplary embodiment, the keyboard deactivation module 101 may include remote keyless entry (RKE) functionality. In this embodiment, when a wireless connection is detected between the module 101 and the target device 102, the vehicle may be unlocked, and when a wireless connection between the module 101 and the target device 102 is disconnected, the vehicle may be locked. The battery 206 of the keyboard deactivation module 101 may permit communication between the module 101 and the target device 102 while the vehicle is off.

According to exemplary embodiments of the present invention, the on-screen keyboard of the target device 102 may be disabled at any time when a text input field is present. As a result, exemplary embodiments may improve safety by prohibiting a driver from being distracted while driving as a result of physically providing input to the target device 102 via the on-screen keyboard. For example, exemplary embodiments may prevent a driver from typing an email, sending a text message, etc. while driving. That is, according to exemplary embodiments, any application on the target device that normally allows for input to be entered via a keyboard may be prevented from receiving input from the user via the on-screen keyboard.

Exemplary embodiments may be implemented in various forms of hardware, software, firmware, special purpose processors, or a combination thereof. In one embodiment, the present invention may be implemented in software as an application program tangibly embodied on a computer readable storage medium embedded within an electronic system mounted within a vehicle.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A keyboard deactivation module, comprising:
a processor configured to generate an on-screen keyboard control signal indicating to a target electronic device whether a mimicked external keyboard is connected to the target electronic device;
a CAN (controller area network) bus interface configured to connect to a CAN bus of a vehicle, and obtain vehicle speed information indicating a current speed of the vehicle from the vehicle via the CAN bus; and
a Bluetooth radio configured to transmit the on-screen keyboard control signal to the target electronic device,
wherein an on-screen keyboard of the target electronic device is enabled in response to the on-screen keyboard control signal indicating to the target electronic device that the mimicked external keyboard is not connected to the target electronic device while the vehicle speed information indicates that the current speed of the vehicle is below a specified threshold, and the on-screen keyboard of the target electronic device is disabled in response to the on-screen keyboard control signal indicating to the target electronic device that the mimicked external keyboard is connected to the target electronic device while the vehicle speed information indicates that the current speed of the vehicle is above a specified threshold,
wherein the keyboard deactivation module is mounted in the vehicle.

2. The keyboard deactivation module of claim 1, wherein the on-screen keyboard control signal is a standard human interface device (HID) command.

3. The keyboard deactivation module of claim 1, wherein the on-screen keyboard control signal is a standard human interface device (HID) command further indicating to the target electronic device whether a keystroke from the mimicked external keyboard has been detected.

4. The keyboard deactivation module of claim 1, wherein the on-screen keyboard control signal comprises an enable on-screen keyboard signal and a disable on-screen keyboard signal,
wherein the Bluetooth radio is configured to transmit the enable on-screen keyboard signal to the target electronic device while the vehicle speed information indicates that the current speed of the vehicle is below the specified threshold, and transmit the disable on-screen keyboard signal to the target electronic device while the vehicle speed information indicates that the current speed of the vehicle is above the specified threshold,
wherein the on-screen keyboard of the target electronic device is enabled upon the target electronic device receiving the enable on-screen keyboard signal, and the on-screen keyboard of the target electronic device is disabled upon the target electronic device receiving the disable on-screen keyboard signal.

5. The keyboard deactivation module of claim 4, wherein the enable on-screen keyboard signal is a first standard human interface device (HID) command indicating to the target electronic device that the mimicked external keyboard is not currently connected to the target electronic device, and the disable on-screen keyboard signal is a second standard HID command indicating to the target electronic device that the mimicked external keyboard is currently connected to the target electronic device.

6. The keyboard deactivation module of claim 4, wherein the enable on-screen keyboard signal is a first standard human interface device (HID) command indicating to the target electronic device that a keystroke from the mimicked external keyboard has not been detected, and the disable on-screen keyboard signal is a second standard HID command indicating to the target electronic device that the keystroke from the mimicked external keyboard has been detected.

7. The keyboard deactivation module of claim 1, wherein the keyboard deactivation module does not comprise a keyboard.

8. A keyboard deactivation module, comprising:
a global positioning system (GPS) radio configured to determine a location of a vehicle;
a processor configured to generate an on-screen keyboard control signal indicating to a target electronic device whether a mimicked external keyboard is connected to the target electronic device, and determine a current speed of the vehicle using the GPS radio; and
a Bluetooth radio configured to transmit the on-screen keyboard control signal to the target electronic device,
wherein an on-screen keyboard of the target electronic device is enabled in response to the on-screen keyboard control signal indicating to the target electronic device that the mimicked external keyboard is not connected to the target electronic device while the current speed of the vehicle is determined to be below a specified threshold, and the on-screen keyboard of the target electronic device is disabled in response to the on-screen keyboard control signal indicating to the target electronic device that the mimicked external keyboard is connected to the target electronic device while the current speed of the vehicle is determined to be above the specified threshold,
wherein the keyboard deactivation module is mounted in the vehicle.

9. The keyboard deactivation module of claim 8, wherein the on-screen keyboard control signal is a standard human interface device (HID) command.

10. The keyboard deactivation module of claim 8, wherein the on-screen keyboard control signal is a standard human interface device (HID) command further indicating to the target electronic device whether a keystroke from the mimicked external keyboard has been detected.

11. The keyboard deactivation module of claim 8, wherein the on-screen keyboard control signal comprises an enable on-screen keyboard signal and a disable on-screen keyboard signal,
wherein the Bluetooth radio is configured to transmit the enable on-screen keyboard signal to the target electronic device while the current speed of the vehicle is determined to be below the specified threshold, and transmit the disable on-screen keyboard signal to the target electronic device while the current speed of the vehicle is determined to be above the specified threshold,
wherein the on-screen keyboard of the target electronic device is enabled upon the target electronic device receiving the enable on-screen keyboard signal, and the on-screen keyboard of the target electronic device is disabled upon the target electronic device receiving the disable on-screen keyboard signal.

12. The keyboard deactivation module of claim 11, wherein the enable on-screen keyboard signal is a first standard human interface device (HID) command indicating to the target electronic device that the mimicked external keyboard is not currently connected to the target electronic device, and the disable on-screen keyboard signal is a second standard HID command indicating to the target electronic device that the mimicked external keyboard is currently connected to the target electronic device.

13. The keyboard deactivation module of claim 11, wherein the enable on-screen keyboard signal is a first standard human interface device (HID) command indicating to the target electronic device that a keystroke from the mimicked external keyboard has not been detected, and the disable on-screen keyboard signal is a second standard HID command indicating to the target electronic device that the keystroke from the mimicked external keyboard has been detected.

14. The keyboard deactivation module of claim 8, wherein the keyboard deactivation module does not comprise a keyboard.

15. A keyboard deactivation module, comprising:
a processor configured to generate an on-screen keyboard control signal indicating to a target electronic device whether a mimicked external keyboard is connected to the target electronic device; and
a Bluetooth radio configured to transmit the on-screen keyboard control signal to the target electronic device,
wherein an on-screen keyboard of the target electronic device is enabled in response to the on-screen keyboard control signal indicating to the target electronic device that the mimicked external keyboard is not connected to the target electronic device while a current speed of a vehicle is determined to be below a specified threshold, and the on-screen keyboard of the target electronic device is disabled in response to the on-screen keyboard control signal indicating to the target electronic device that the mimicked external keyboard is connected to the target electronic device while the current speed of the vehicle is determined to be above the specified threshold,
wherein the current speed of the vehicle is determined by querying the target electronic device,
wherein the keyboard deactivation module is mounted in the vehicle.

16. The keyboard deactivation module of claim 15, wherein the current speed of the vehicle is determined using at least one of a GPS radio of the target electronic device, a cellular radio of the target electronic device, and a WiFi radio of the target electronic device.

17. The keyboard deactivation module of claim 15, wherein the on-screen keyboard control signal is a standard human interface device (HID) command.

18. The keyboard deactivation module of claim 15, wherein the on-screen keyboard control signal is a standard human interface device (HID) command further indicating to the target electronic device whether a keystroke from the mimicked external keyboard has been detected.

19. The keyboard deactivation module of claim 15, wherein the on-screen keyboard control signal comprises an enable on-screen keyboard signal and a disable on-screen keyboard signal,
wherein the Bluetooth radio is configured to transmit the enable on-screen keyboard signal to the target electronic device while the current speed of the vehicle is determined to be below the specified threshold, and transmit the disable on-screen keyboard signal to the target electronic device while the current speed of the vehicle is determined to be above the specified threshold,
wherein the on-screen keyboard of the target electronic device is enabled upon the target electronic device receiving the enable on-screen keyboard signal, and the on-screen keyboard of the target electronic device is disabled upon the target electronic device receiving the disable on-screen keyboard signal.

20. The keyboard deactivation module of claim 19, wherein the enable on-screen keyboard signal is a first standard human interface device (HID) command indicating to the target electronic device that the mimicked external keyboard is not currently connected to the target electronic device, and the disable on-screen keyboard signal is a second standard HID command indicating to the target electronic device that the mimicked external keyboard is currently connected to the target electronic device.

21. The keyboard deactivation module of claim 19, wherein the enable on-screen keyboard signal is a first standard human interface device (HID) command indicating to the target electronic device that a keystroke from the mimicked external keyboard has not been detected, and the disable on-screen keyboard signal is a second standard HID command indicating to the target electronic device that the keystroke from the mimicked external keyboard has been detected.

22. The keyboard deactivation module of claim 15, wherein the keyboard deactivation module does not comprise a keyboard.

23. A non-transitory computer readable storage medium embodying instructions executed by a processor to perform a method of enabling and disabling an on-screen keyboard of a target electronic device, comprising:
obtaining vehicle speed information indicating a current speed of a vehicle;
generating an on-screen keyboard control signal indicating to the target electronic device whether a a mimicked external keyboard is connected to the target electronic device; and
transmitting the on-screen keyboard control signal to the target electronic device via a Bluetooth connection, wherein the on-screen keyboard of the target electronic device is enabled in response to the on-screen keyboard control signal indicating to the target electronic device that the mimicked external keyboard is not connected to the target electronic device while the vehicle speed information indicates that the current speed of the vehicle is below a specified threshold, and the on-screen keyboard of the target electronic device is disabled in response to the on-screen keyboard control signal indicating to the target electronic device that the mimicked external keyboard is connected to the target electronic device while the vehicle speed information indicates that the current speed of the vehicle is above a specified threshold, wherein the computer readable storage medium is embedded within an electronic system mounted within the vehicle.

24. The non-transitory computer readable storage medium of claim 23, wherein the vehicle speed information is obtained via a connection to a CAN (controller area network) bus of the vehicle.

25. The non-transitory computer readable storage medium of claim 23, wherein the on-screen keyboard control signal is a standard human interface device (HID) command.

\* \* \* \* \*